United States Patent [19]
Parvulescu

[11] 3,939,461
[45] Feb. 17, 1976

[54] CORRELATION SYSTEM USING MATCHED SIGNALS

[75] Inventor: Antares Parvulescu, Hastings-on-Hudson, N.Y.

[73] Assignee: The United States of America as represented by the Secretary of the Navy, Washington, D.C.

[22] Filed: Nov. 19, 1962

[21] Appl. No.: 238,810

[52] U.S. Cl.............. 340/3 R; 340/5 R; 343/100 CL
[51] Int. Cl.²...................... H04B 11/00; G01S 9/66
[58] Field of Search............... 343/17.1, 100.7, 17.2; 340/3, 5, 15.5, 6, 16, 15.5 C, 3 M, 15.5 F; 333/70, 70 T

[56] References Cited
UNITED STATES PATENTS
2,864,072  12/1958  Blake................................. 340/15.5

OTHER PUBLICATIONS
Smith, Geophysics, Vol. 23, No. 1, Jan. 1958, pp. 44–50, 54 & 57.
Backus, Geophysics, Vol. 24, No. 2, Apr. 1959, pp. 233, 234 & 261.

Primary Examiner—Richard A. Farley
Attorney, Agent, or Firm—R. I. Tompkins; L. B. Applebaum; P. Schneider

EXEMPLARY CLAIM

4. A signal-reconstitution method for signals transmitted through a bounded medium comprising the steps of:

propagating a first signal from one point in said bounded medium;

receiving the propagated signal at another point in said bounded medium;

propagating the received signal from one of said points;

receiving the second propagated signal at the other of said points;

reversing the second received signal with respect to time;

propagating said reversed signal from one of said points in said bounded medium; and, when a reflecting object is present at the other of said points, receiving an echo signal at the point at which the reversed signal was propagated, the form of said echo signal approximating the form of said first signal.

10 Claims, 8 Drawing Figures

INVENTOR.
ANTARES PARVULESCU
BY Philip Schneider
Louis B. Applebaum

CORRELATION SYSTEM USING MATCHED SIGNALS

This invention relates to a method and means for reconstituting a signal which has been propagated through a bounded medium so that an approximation of the original signal is recovered, and especially to a method and means utilizing matching techniques for correlating signals propagated through a bounded medium.

The invention may be utilized with either electromagnetic or sonic radiation although it will be described herein with respect to sonic applications.

A signal, such as an impulse, which is transmitted through a bounded medium is subjected to distortion because of reflections from the boundaries and other objects within the medium, refraction within the medium, and other physical factors related to the medium. A particular bounded medium configuration possesses a particular characteristic response to signals propagated between any two fixed points within the medium, the response being different for different sets of points. This characteristic response is termed its impulse response (mathematically known as Green's Function) when the input signal is an impulse (i.e., Dirac delta function). It is evident that the bounded medium may be considered to be analogous to a filter network (or simply a filter) to which an input signal is applied and from which an output signal is derived, and will be so considered herein.

In order that the signal arriving at the receiving point shall be a reasonable approximation of the original signal waveform (in this instance an impulse), it is necessary to remove the distorting effect of the bounded medium. This can be done by passing the signal through another filter which is the "inverse" of the bounded medium filter. Another method, which recovers the original signal in an approximate rather than exact form, is to pass the output of the first filter network through the output of a second filter which is "matched" to the characteristic of the first filter network (i.e., the curves representing the impulse responses of the two filters with respect to time are mirror images of each other, or if the impulse response of the bounded medium is $P(t)$, the impulse response of the matched filter will be $P(-t)$ ). However, design of a matched filter for a complex medium such as the ocean is too complicated to be attempted successfully in practice.

The method employed by the present invention is to use the same filter network (viz., the same path between the same two fixed points in the bounded medium) for the matched filter, and to obtain matching by means of a signal matched to the output of the filter network (i.e., the filter output signal reversed in time). This is accomplished by sending an impulse signal between the two fixed points, as from point A to point B in the bounded medium, recording the signal received at point B, reversing the recorded signal with respect to time, and transmitting the reversed signal (the matched signal) from either point to the other, where it is received as an impulse or, speaking more strictly, where it is reconstituted as a correlation-function signal having a peak at the center which approximates a short pulse.

An object of the invention is to overcome the distortion introduced into a signal transmitted through a bounded medium, especially the "phase distortion" which changes a brief strong pulse into a long, weak signal.

Another object is to reduce to the maximum the undesirable effects of echoes, multipath propagation, diffraction and random noise upon a signal transmitted through a bounded medium and, in so doing, to utilize all the energy that arrives at the receiver.

A further object is to produce at a chosen point in a bounded medium a signal which is of as brief a duration as possible, as strong as possible and as limited to the immediate vicinity of the chosen point as possible within the limitations of the characteristic response of the bounded medium between the sending point and the chosen receiving point.

Yet another object is to permit communication between fixed points in a bounded medium, said communication being optimally insensitive to interference and optimally secure from interception.

Still another object is to permit the design and construction of a surveillance system such as might utilize echo-ranging techniques, which is optimally insensitive to jamming, optimally directed to a specific region of the space under surveillance, optimally insensitive to ambient noise and will produce stronger returns from targets for the same output power than present surveillance systems.

A further object is to provide a system which permits the determination of the rate and manner of changes in the propagation properties of a bounded medium, such as changes in the propagation properties of the ocean caused by tide, weather and other influences.

Other objects and many of the attendant advantages of this invention will be readily appreciated as the same becomes better understood by reference to the following detailed description when considered in connection with the accompanying drawings wherein:

FIG. 8 is a simplified representation of the reconstitution of an impulse signal by the double-match technique of this invention, as the invention is applied to target detection.

Figure 1:
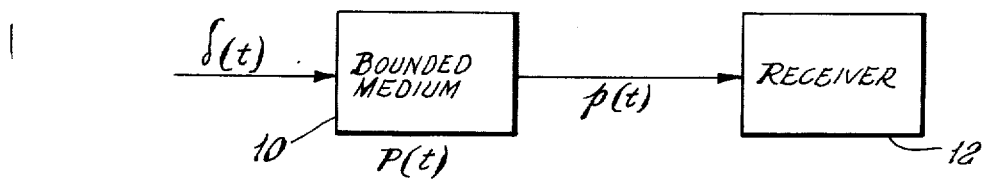
FIG. 1 is a schematic block diagram illustrating the propagation of an impulse through a bounded medium.

FIG. 1 illustrates the situation which exists when an impulse (ideally, the delta function, $\delta(t)$, is propagated through a bounded medium 10. (Hereinafter the time symbol ($t$) will be understood for any function in which it is omitted, so that the delta function may be written simply as $\delta$.) The bounded medium 10 may, for instance, be a room in which a microwave (electromagnetic) transmitter and receiver are located, or an ocean in which sonic transmitting and receiving transducers are immersed.

The bounded medium has certain characteristic modes of reflecting and refracting signals which lead to a distortion of the propagated signal. If the transmitting and receiving points are at specific fixed locations, it may be said that the bounded medium 10 acts as though it were a network with a certain response characteristic, P(t), which is called its impulse response (the symbol P(t) denotes some function, P, of time). The signal received at the receiver 12, p(t), is then equal to the convolution of the transmitted impulse $\delta(t)$, and the impulse response of the medium, i.e., P * $\delta$. (This is a shorthand notation for the more formal expression for the convolution integral, $$p(t) = \int_{-\infty}^{\infty} \delta(t) P(\tau-t) dt, \text{ or } \int_{-\infty}^{\infty} P(t) \delta(\tau-t) dt.)$$

For an explanation of the convolution integral, see Scott, "Linear Circuits", Part 1, Pgs. 431–448, 1960 ed., published by Addison-Wesley Publishing Co., Inc., Reading, Mass.

A more general form of the convolution integral is $$\int_{-\infty}^{\infty} f_1(t) f_2(\tau-t) dt.$$

This form also expresses a measure of the correlation between two functions-autocorrelation if $f_1$ and $f_2$ are the same function and cross-correlation if $f_1$ and $f_2$ are different functions. The type of signal which this integral provides will hereinafter be designated as a correlation-function signal.

Figure 2:
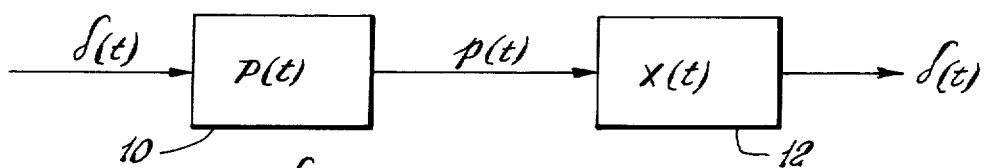
FIG. 2 is a schematic block diagram illustrating the use of an inverse filter to recover the original propagated signal.

At the receiver 12, it is desired to operate upon the received signal, p(t), so that the waveshape of the transmitted signal, $\delta(t)$, is obtained. To recover the transmitted impulse exactly, as illustrated in FIG. 2, the receiver must operate upon the received waveform, p(t), with a detector having an impulse response, X(t), such that $X(t) * p(t) = \delta(t)$. This means that $X(t) P(t) * \delta(t) = \delta(t)$, from which it is obvious that [$X(t) * P(t)$] should equal unity and that, therefore, $X(t)$ must in some sense be the inverse of P(t).

A filter having a response $X(t)$ such that $[X * P] = 1$ is called the "ideal inverse" of a filter having the impulse response characteristic P(t). An ideal inverse exists and no information is lost in the transmission and detection processes if, and only if, the operator P(t) is isentropic. To synthesize such a filter to match the complex characteristics of the ocean, for example, is an extremely complicated, if not impossible, task.

It may be noted that since the convolution operation is commutative, $P^* (X^*\delta) = X^* (P^*\delta)$. This means that the inverse filter may be employed at the transmitter end to operate on the impulse function before it is transmitted, as well as at the receiver end to operate on the response function. This has the advantage that the transmitter can now send a really long signal carrying a great deal of energy, thereby enhancing the detectability of the propagated signal.

Figure 3:
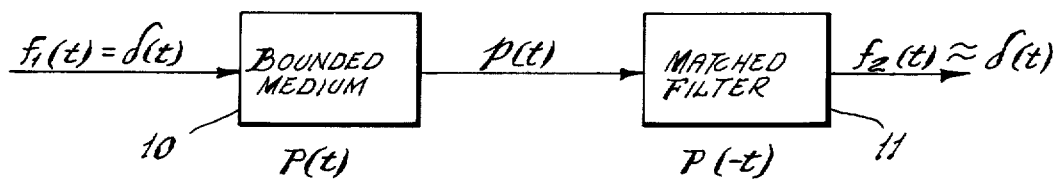
FIG. 3 is a schematic block diagram illustrating the use of a matched filter in place of the inverse filter of FIG. 2.

As shown in FIG. 3, a matched filter 11 can be substituted for the ideal inverse filter 12 to recover an approximation of the input impulse signal, $\delta(t)$. The filter 11 is said to be matched to the signal p(t) if its characteristic is the same as that of the impulse response but reversed in time, namely P(−t). The ideal inverse filter compensates for all distortions of the input signal by the bounded medium and the matched filter compensates only for the phase distortion introduced, but since the major part of signal distortion in a bounded medium is phase distortion, the matched filter is a reasonable approximation of the ideal inverse filter.

It has been observed that synthesis of a matched filter is an extremely complicated (in the case of oceanic transmission, at any rate), if not impossible, task. This synthesis can be avoided by utilizing the bounded medium itself in place of the matched filter and employing a matched signal (i.e., a signal matched to the characteristics of the bounded medium, so that when it is transmitted through the bounded medium, it will be received as a correlation-function signal at the receiver location. Since the correlation-function signal is more or less symmetrical about a central pulse, it may be said that the central pulse approximates an impulse).

The mathematics for FIG. 3 is as follows, it being understood that the limits for the integrals are −∞ to +∞, that the convolution integral is commutative, that P(t) is the impulse response of the bounded medium, and that changes (e.g., from t to x and y) in variables are intended to make the integration operations simpler:

$$p(t) = \int f_1(x) P(x-t) dx \quad \text{I}$$
$$f_2(t) = \int p(y) P(t-y) dy \quad \text{II}$$

Now, let $t-y = w$; then $y = t-w$ and $dy = -dw$.

$$f_2(t) = -\int p(t-w) P(w) dw \quad \text{III}$$
$$10 = -\int P(w) dw \int f_1(x) P(x-t+w) dx \quad \text{IV}$$
$$= -\int f_1(x) dx \int P(w) P(w + x-t) dw \quad \text{V}$$
$$= -\int f_1(x) p(x-t) dx \quad \text{VI}$$

Since P(w) is the impulse response of the bounded medium, $\int P(w) P(w+x-t) dw$ gives a correlation-function signal which approximates an impulse, i.e., $p(x-t) \approx \delta(x)$. Therefore equation VI becomes:

$$f_2(t) \approx -\int f_1(x) \delta(x) dx \approx f_1(t) \approx \delta(t) \quad \text{VII}$$

A convolution theorem states that:

$$\int a(t) b(-t) dt = \int a(-t) b(t) dt. \quad \text{VIII}$$

Applying this theorem to equation II:

$$f_2(t) = \int p(y) P(t-y) dy = \int p(y) P[-(y-t)] dy \quad \text{IX}$$
$$= \int p(-y) P_{y-t} dy \quad \text{X}$$

Figure 4:
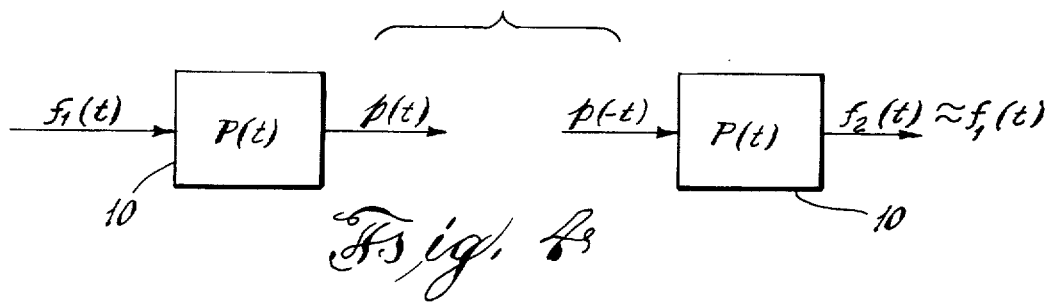
FIG. 4 is a schematic block diagram illustrating the principle of one embodiment of the present invention.

Realizing the equivalence of the signal p(t) to a signal p(y) (i.e., the signal is the same even though the variable has been changed for mathematical purposes), equation X states that a matched signal, p(−y), (i.e., a signal matched to the impulse response characteristic of the bounded medium 10) can be passed through the bounded medium itself and the output signal, $f_2(t)$, will be approximately the same as the input signal, $f_1(t)$. Thus, there is no need to build a matched filter; the identical filter can be employed to recover the original signal, $f_1(t)$, if a matched signal, p(−t), is used. The matched signal, p(−t), is easily obtained by reversing p(t) with respect to time. This principle is schematically illustrated in FIG. 4.

Figure 5:
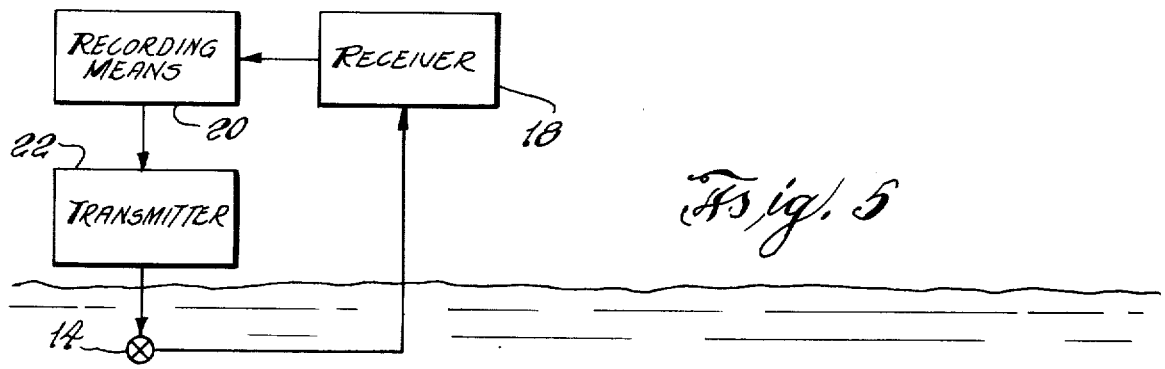
FIG. 5 is a schematic block diagram illustrating one embodiment of the invention.

FIG. 5 illustrates a method of practicing the invention. Let a receiver 18 be placed at location 14 in a bounded medium 10, such as the ocean. A signal, preferably a sonic impulse, is transmitted from a location 16. The impulse is received at location 14 as a set of distorted impulses (due to the response characteristic of the bounded medium, which results from echoes, diffraction, etc.), the received waveform being called the impulse response, p(t). The impulse response, p(t), is recorded by recording means 20 such as a tape recorder, for example. If the tape is played back in reverse (this results in reversal of p(t) with respect to time) and the reversed waveform is now transmitted by a transmitter 22 through the bounded medium 10, a correlation-function signal approximating a sonic impulse is received at location 16. This approximation of an impulse has greater power than is present in any one of the set of distorted impulses which comprised the signal sent from location 14. Returning to equation IV, if $f_1(t)$ is an impulse signal, $\delta(t)$, then $f_2(t) \approx \int P(\tau-t)P[-(\tau-t)]dt$; this is the convolution of two signals $P$ and therefore, as has been mentioned before, is an autocorrelation which results in this case in a correlation-function signal approximating an impulse. If $f_1(t)$ is some signal other than an impulse, the output $f_2(t)$ approximates the form of $f_1(t)$ (i.e., $f_2(t)$ is a correlation-function signal approximating the form of $f_1(t)$).

The multipath effect of the bounded medium upon the signal at any other location than location 16 will be different from that along the path from 14 to 16 and the recombination of the echoes will be greatly impaired if not completely lost. Thus, it can be said that the matched signal transmitted from location 14 is focused at location 16 in both time and space.

The original impulse signal may be obtained by exploding a charge of dynamite at location 16, or one of many types of underseas sonic pulse generators may be used, for example. The signal received at location 14 is recorded on a recording medium such as a magnetic tape if the recording means is a tape recorder.

The tape is played back in reverse to obtain a matched signal which is transmitted from location 14 each time it is desired to generate an impulse at location 16 from location 14. Messages can be sent in this manner to location 16 by utilizing a code consisting of various combinations of pulses, or reception of echoes at location 14 will indicate the presence of a reflecting target such as a submarine at location 16. This latter mode of utilization of the invention is indicated schematically in FIG. 6. The return echoes from a submarine will also be distorted by P(t) of the bounded medium. The recombination of the target return echoes into an approximation of a single pulse requires correlation with the same reference function P(t) and can be accomplished either by the ordinary correlation technique of multiplication of the signals at one fixed delay, or by transmitting a doubly matched signal.

Figure 7:
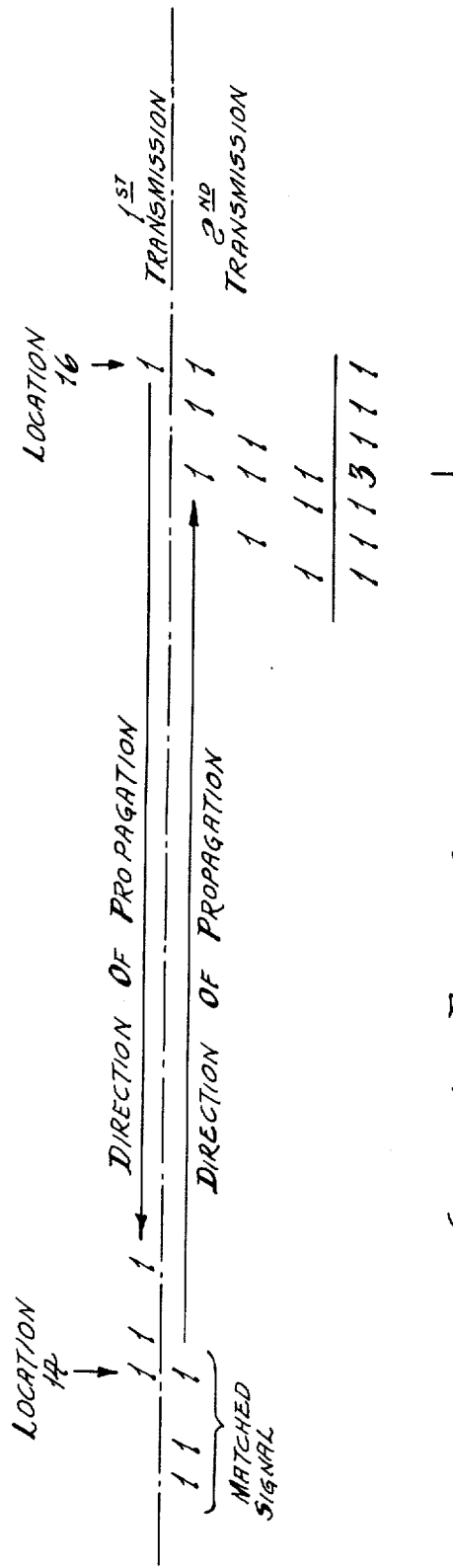
FIG. 7 is a simplified representation showing the reconstitution of an impulse signal by the single-match technique of this invention.
Figure 6:
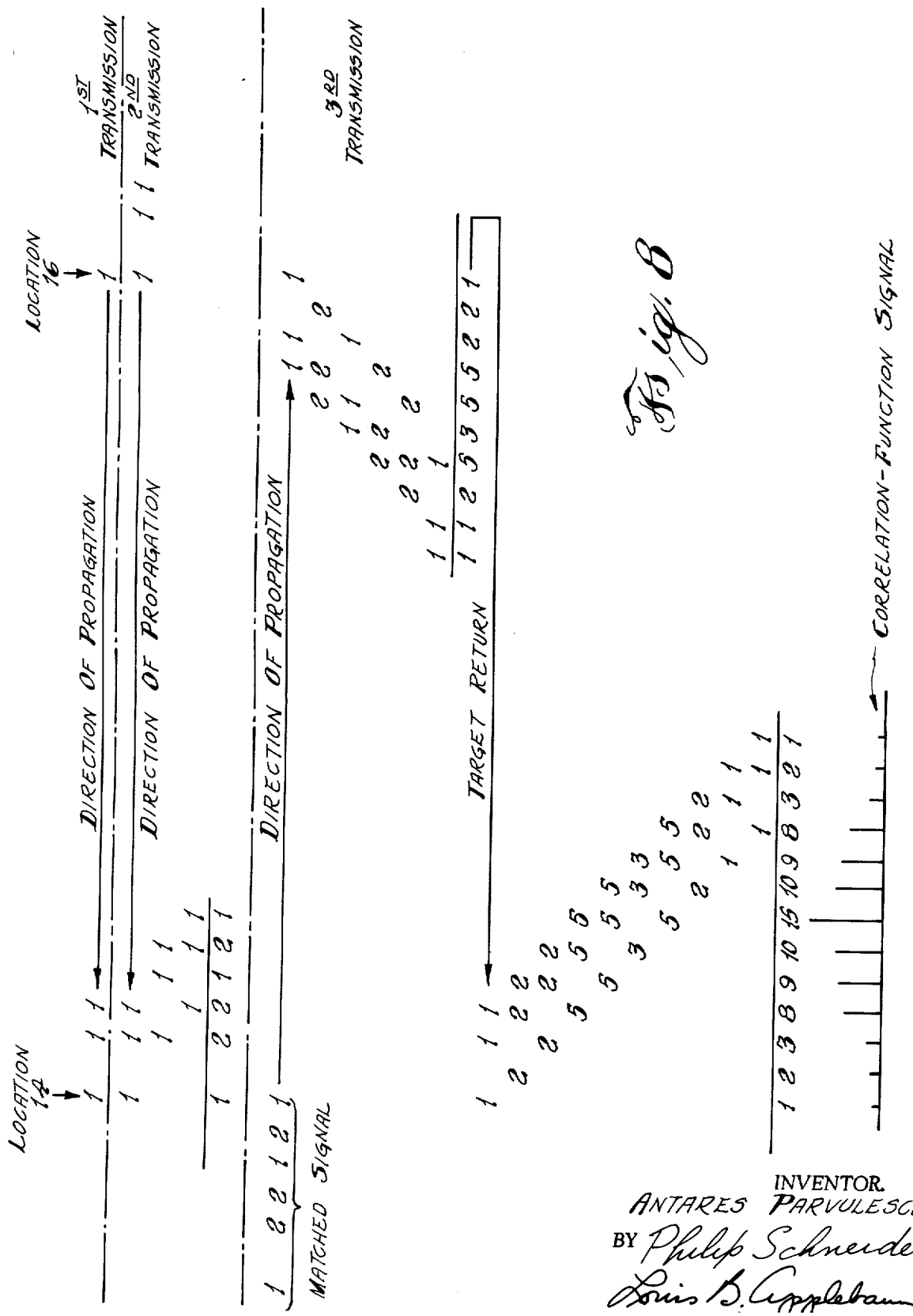

A technique which can be utilized to practice the invention in what might be termed its single-match mode is illustrated in FIG. 7. Here an impulse signal is transmitted from a location 16 and received at another location 14 within a bounded medium. The received signal will be a group of spaced echoes usually immersed in a background of noise which is not shown for the sake of clarity. There will usually be more echoes than shown, but the three which are shown are sufficient to illustrate the principle.

The received signal is matched to the characteristic of the bounded medium by reversing it with respect to time. The matched signal is then transmitted either from location 14 or location 16. As shown in FIG. 7, the matched signal is transmitted from location 14 and the reconstituted signal (correlation-function signal) at location 16 shows a distinct impulse at the center, the ratio of the center impulse to the side echoes being 3 to 1.

Figure 6:
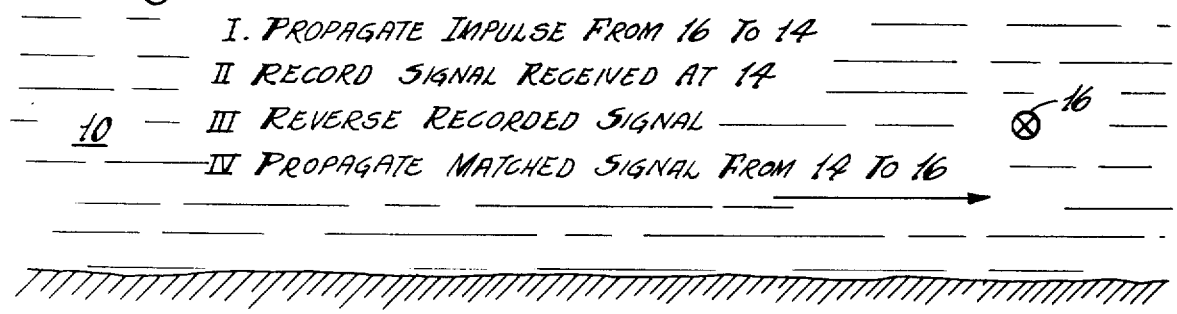
FIG. 6 is a chart illustrating a second embodiment of the invention, which is useful for surveillance systems.
Figure 6:
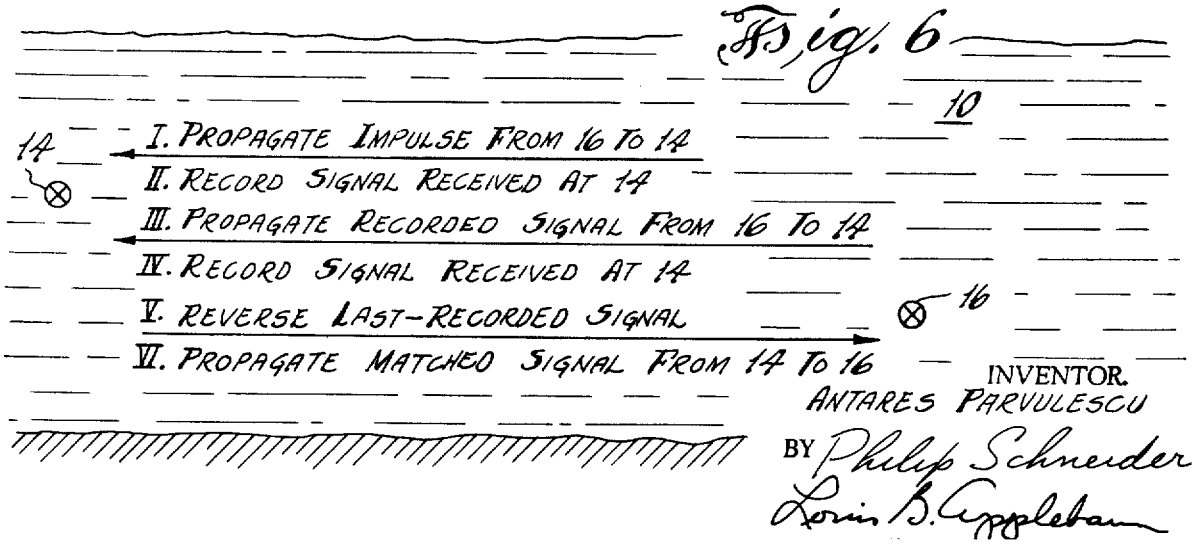

The transmission of what hereafter are designated as doubly matched signals is the method for practising the invention illustrated in FIG. 6. Here a signal is propagated through the medium twice before being reversed in time, so that an echo reflected from a target appears at the sending location as a correlation-function signal approximating an impulse. In this method, an impulse signal is sent from location 16 to location 14 and recorded at the latter location. The recorded signal which may, for example, be a group of three spaced, pulse-type echoes (see line marked "1st transmission" in FIG. 8.) is then transmitted from location 16 to location 14. (In the ocean, there would actually be a great many more than three echoes.) The nine echoes which result from this transmission add at the receiving location to form a group of six echoes not all of which are of the same amplitude (i.e., some are of larger amplitude than would result from a single impulse transmission from location 14). This is indicated in FIG. 8, by the sequence 1 22121 which denotes echoes of single and double amplitude comprising the additive signal received at location 16. (It should be noted that, to avoid confusion, no account is taken in FIG. 8 of the fact that transmission through the medium will reduce the amplitude of echoes received at location 16, so that the numbers used are significant only as relative, not absolute, amplitudes.) The received group of six pulse-type echoes is recorded at location 14 and the waveform of this recording, when reversed, constitutes the matched signal. If the matched signal is transmitted from location 14, and a target is present at location 16, the target return at location 14 is a correlation-function signal with a pulse at the center which has an amplitude sufficiently greater than the other pulses of which it is constituted to permit the center pulse to be considered an approximation of the original impulse signal. This central pulse is quite definite and permits easy identification of the target return even under high ambient noise conditions.

It should be noted that although the original was said to have been propagated from location 16 to location 14, it could just as well have been propagated from location 14 to 16 since the characteristic response of the bounded medium is the same regardless of the direction in which the signal is transmitted as long as it is sent between the same two fixed points.

One important advantage of this method of detecting targets is that the power of the target return impulse received at location 14 is much greater than can be obtained by conventional methods of sonar or radar detection if a transmitter of the same output power is employed in both instances. This is because of the addition of pulses that occurs.

Other advantages of the present invention are the focusing of the transmitted signal at a specific point in the propagating medium, the automatic utilization of the optimum transmission rate permitted by the propagating medium, the provision of optimum insensitivity to random noise and the security of the signals from interception by any receivers except those in the immediate vicinity of the predetermined receiving location.

Nothing in this invention precludes the use of pulse compression techniques of the usual types in addition to the pulse compression which is inherent in the addition of individual spaced echoes as shown in FIG. 7.

Obviously many modifications and variations of the present invention are possible in the light of the above teachings. It is therefore to be understood that within the scope of the appended claims the invention may be practiced otherwise than as specifically described.

I claim:

1. A method for reconstituting a signal which must be propagated between two points in a bounded physical medium so that an approximation of said signal is recoverable comprising the steps of:

propagating said signal from one point to another point within said bounded medium;

receiving the propagated signal at said other point;

reversing said received signal with respect to time so that it constitutes a signal matched to the characteristic response of the bounded medium between said two points; and propagating said matched signal through said bounded physical medium from one of said points when a signal approximating said originally propagated signal is desired at the other of said points.

2. A method for reconstituting an impulse signal which must be propagated between two points in a bounded physical medium so that an approximation of the original signal is recoverable comprising the steps of:

propagating an impulse signal from one point to another point within said bounded medium;

receiving the propagated signal at said other point;

reversing said received signal with respect to time so that it constitutes a signal matched to the characteristic response of the bounded medium between said two points; and propagating said matched signal through said bounded physical medium from one of said points when a signal approximating an impulse signal is desired at the other of said points.

3. A method for obtaining as an output a correlation-function signal approximating the input signal when an impulse must be propagated between two points in a bounded physical medium, said method comprising the steps of:

propagating said impulse from one point to another point within said bounded medium;

obtaining as an output the signal received at said other point;

converting said received signal into a signal reversed in time with respect to said received signal; and propagating said reversed signal through said bounded physical medium from one of said points when a signal approximating an impulse signal is desired at the other of said points.

4. A signal-reconstitution method for signals transmitted through a bounded medium comprising the steps of:

propagating a first signal from one point in said bounded medium;

receiving the propagated signal at another point in said bounded medium;

propagating the received signal from one of said points;

receiving the second propagated signal at the other of said points;

reversing the second received signal with respect to time;

propagating said reversed signal from one of said points in said bounded medium; and, when a reflecting object is present at the other of said points, receiving an echo signal at the point at which the reversed signal was propagated, the form of said echo signal approximating the form of said first signal.

5. A signal-reconstitution method for signals transmitted through a bounded medium comprising the steps of:

propagating an impulse signal from one point in said bounded medium;

receiving the propagated signal at another point in said bounded medium;

propagating the received signal from one of said points;

receiving the second propagated signal at the other of said points;

reversing the second received signal with respect to time;

propagating said reversed signal from one of said points in said bounded medium; and, when a reflecting object is present at the other of said points, receiving an echo signal at the point at which the reversed signal was propagated, the form of said echo signal being that of a correlation-function signal having a peak at the center which approximates an impulse.

6. A method for reconstituting a signal which must be propagated through a filter network and will be distorted by the characteristics thereof comprising the steps of:

propagating said signal through said filter network and deriving a doubly-matched signal therefrom, the matching of the signal being to the characteristic response of said network; and propagating said matched signal twice through said network, a signal approximating the originally propagated signal being derivable at the end of said second propagation.

7. A method for reconstituting an impulse signal which must be propagated through a filter network and will be distorted by the characteristics thereof comprising the steps of:

propagating said impulse signal through said filter network and deriving a signal doubly-matched to the impulse response of said network; and propagating said matched signal twice through said network, a signal approximating said impulse signal being derivable at the end of said second propagation.

8. A method for reconstituting a signal which must be propagated between two points in a bounded medium so that an approximation of said signal is recoverable comprising the steps of:

propagating said signal from one point to another within said bounded medium and receiving said signal at said other point;

propagating the received signal between said two points and receiving the second propagated signal;

deriving a doubly-matched signal from the signal received as a result of the second propagation;

propagating said doubly-matched signal twice between said two points, the form of the signal at the end of said double propagation approximating the form of a signal to be reconstituted.

9. A method for reconstituting an impulse signal which must be propagated between two points on a bounded medium so that an approximation of said signal is recoverable comprising the steps of:

propagating said impulse signal from one point to another within said bounded medium and receiving said signal at said other point;

propagating the received signal between said two points and receiving the second propagated signal;

deriving a doubly-matched signal from the second received signal;

propagating said doubly-matched signal twice between said two points, the form of the signal at the end of said double propagation approximating the form of the signal to be reconstituted.

10. A system for the correlation of signals propagated through a bounded physical medium comprising:
   signal propagating means in said medium at one location;
   receiving means in said medium at another location;
   means to record a signal received by said receiving means from said propagating means;
   means to reverse said recorded signal whereby a matched signal is derived; and
   means to propagate the matched signal through said bounded physical medium between said locations.

* * * * *